US006627849B2

(12) United States Patent
Ihde et al.

(10) Patent No.: US 6,627,849 B2
(45) Date of Patent: Sep. 30, 2003

(54) AUTOMATIC DETECTION OF ROBOT TYPE

(75) Inventors: Jeffery R. Ihde, Greenville, WI (US); Anthony J. Kowaleski, Manawa, WI (US)

(73) Assignee: Illinois Tool Works Inc., Glenview, IL (US)

( * ) Notice: Subject to any disclaimer, the term of this patent is extended or adjusted under 35 U.S.C. 154(b) by 81 days.

(21) Appl. No.: 09/853,354

(22) Filed: May 11, 2001

(65) Prior Publication Data

US 2002/0166850 A1 Nov. 14, 2002

(51) Int. Cl.[7] .................................................. B23K 9/10
(52) U.S. Cl. ................................ 219/130.5; 219/125.1; 901/42
(58) Field of Search .......................... 219/130.5, 130.1, 219/130.21, 125.1, 125.11; 901/42

(56) References Cited

U.S. PATENT DOCUMENTS

| | | | | |
|---|---|---|---|---|
| 4,561,059 A | * | 12/1985 | Davis et al. ........... | 219/130.21 |
| 4,647,753 A | * | 3/1987 | Nakashima et al. ..... | 219/130.5 |
| 5,208,436 A | * | 5/1993 | Blankenship ........... | 219/130.1 |
| 5,278,390 A | * | 1/1994 | Blankenship ........... | 219/130.5 |
| 6,096,994 A | * | 8/2000 | Handa et al. ............ | 219/130.5 |

OTHER PUBLICATIONS

Auto Invision Part 1 of 2 May 1999.
Auto Invision Part 2 of 2 May 1999.
Automatic M Microprocessor Weld Control.
Deltaweld Series Jul. 2000 Technical Manual.
Robotic Interface II Dec. 1999.
Robotic Interface II Owner's Manual Sep. 1998.

* cited by examiner

*Primary Examiner*—Clifford C. Shaw
(74) *Attorney, Agent, or Firm*—George R. Corrigan

(57) ABSTRACT

A method and apparatus for welding with a robotic welder is disclosed. The system includes a power supply, a controller and a robotic interface. The controller includes, in a single housing, a robot-type detector and at least one power control output connected to the power supply. The robot-type detector is connected to the robot interface. An adaptor cord connects the robot controller to the power supply. The controller also has an automatic set-up control connected to the power control output.

41 Claims, 4 Drawing Sheets

AUTOMATIC DETECTION OF ROBOT TYPE

FIELD OF THE INVENTION

The present invention relates generally to the art of welding. More specifically, it relates to welding with robotic welders.

BACKGROUND OF THE INVENTION

There are many type of known welding systems used for many processes. Welding system, as used herein, includes one or more of a power supply, wire feeder, controller, and source of gas. It may also include peripherals such as robots etc.

One welding application is a MIG process used with a robotic welder, such as that performed by a Miller DeltaWeld™ or Miller Auto Invision™, when used with a robot. This invention will be described particularly with reference to robotic MIG welding systems. Robotic MIG welding is performed with a power supply, welding controller, wire feeder and robot (having controller and mechanical portions). The welding controller provides control signals to the wire feeder (IPM, or jog information) to the wire feeder. It also provides control signals to the power supply (switching information, or setpoints e.g.).

Often, the robot includes its own controller. The welding process is controlled by first setting up the welding system (setting robot type, and output parameters). After setting up the system the welding process may be controlled by the robot controller. For example, the user inputs information to the robot controller, and the robot controller provides control information to the welding controller.

The welding controller must be able to communicate with the robot controller for proper control of the welding process. However, each robot manufacturer has it own control output for interfacing with the welding system and its own control commands. Thus, a unique connector is needed for each robot. Also, a "translator" that translates the robot controller commands to commands used by the welding controller must be provided.

The prior art provides an interface box designed for a particular robot, such as one of several (one per robot) Miller Robotic Interface II™. The user would choose the interface box depending upon which robot type they use. Also, a cord that mates with the robot connector at one end, and the interface box at the other end, was needed. The interface box also had a cord to connect to the welding system. The interface translates the robot controller commands to commands used by the welding power supply, so that the robot can control the process.

A prior art solution for inverter-type power supplies (which are relatively sophisticated and have advanced controllers) was to have the robotic interface inside the power supply housing. Again, the interface was dedicated to a single type of robot. If the user changed robots, the welding power supply had to be opened, and the interface was replaced.

Unfortunately, the need for different interfaces for different robots results in increased numbers of interfaces, increased complexity, and increased costs if the user changes robot type.

Additionally, because the welding controller did not know the type of robot, the welding system first had to be set-up for that robot, either through the front panel of the power supply, or using the interface box.

Also, it requires time and skill to properly set up the welding system for the particular robot and application.

Accordingly, a robotic welding system that provides for ease of connection between different robots and a single welding power supply is desirable. Preferably the type of robot can be automatically detected. Also, preferably the welding system will be automatically set-up.

SUMMARY OF THE PRESENT INVENTION

In accordance with a first aspect of the invention a welding system used with a robotic welder includes a power supply, a controller and a robotic interface. The controller includes, in a single housing, a robot-type detector and at least one power control output connected to the power supply. The robot-type detector is connected to the robot interface.

According to a second aspect of the invention a method of welding with a robotic welder includes providing welding power, interfacing with a robot, controlling the welding power, and detecting the robot type from information obtained through the interface.

Various embodiments provide that the robot interface includes part of a mated connection that mates with an adaptor cord, and the cord has a robot connection at the other end. The cord may be one of a plurality of adaptor cords, each having a different robot connection. The mated connection has a plurality of connectors and software uses the presence and absence of connections thereon to determine the robot type in yet another alternative.

The robot-type detector is comprised of a software implemented by a digital circuit in another embodiment.

The controller includes an automatic set-up control connected to the robot interface and the power control output in another alternative.

The power supply is a phase controlled power supply in a preferred embodiment

According to a third aspect of the invention a method of connecting a welding system to a robotic welder includes selecting an adaptor cord for the robot type and connecting a first end of the cord to the welding system. The second end of the cord is connected to the robot and the robot type is determined from the connections made.

According to a fourth aspect of the invention an adaptor cord for connecting a welding system to a robotic welder includes a first end having half of a mated connection. The other half is on the welding power supply. There are a plurality of connectors on the first end, and the arrangement and/or connections made thereto indicate the robot type. The other end of the cord mates with a connector on the robot.

According to a fifth aspect of the invention a welding system used with a robotic welder includes a power supply and a controller. The power supply has a control input. The controller has a power control output connected to the control input. The controller also has an automatic set-up control connected to the power control output.

According to a sixth aspect of the invention a method of welding with a robotic welder includes providing welding power, controlling the power provided and automatically setting-up the system.

According to a seventh aspect of the invention a welding system includes a phase controlled power supply having at least one control input. A wire feeder has at least one feeder control input, and is connected to the power supply. A controller includes a power control output connected to the at least one control input, a feeder control output connected to the feeder control input, and an automatic set-up control connected to the power control output and feeder control output.

In one embodiment one or more of the following parameters are set up automatically: mig type, aux output, voltage, memory, mig type, arc start, arc time, wire feed, wire type, display, memory, shutdown, name, program, stick check, jog imp, robot type, flow, monitor, and software.

The system includes a wire feeder and/or the power supply is phase controlled power supply in other alternatives.

The controller has a robot interface though which a robot provides the parameters to the automatic setup control and/or a robot type detector is connected other alternatives.

The automatic setup control includes a microprocessor in another embodiment.

Other principal features and advantages of the invention will become apparent to those skilled in the art upon review of the following drawings, the detailed description and the appended claims.

Figure 1:
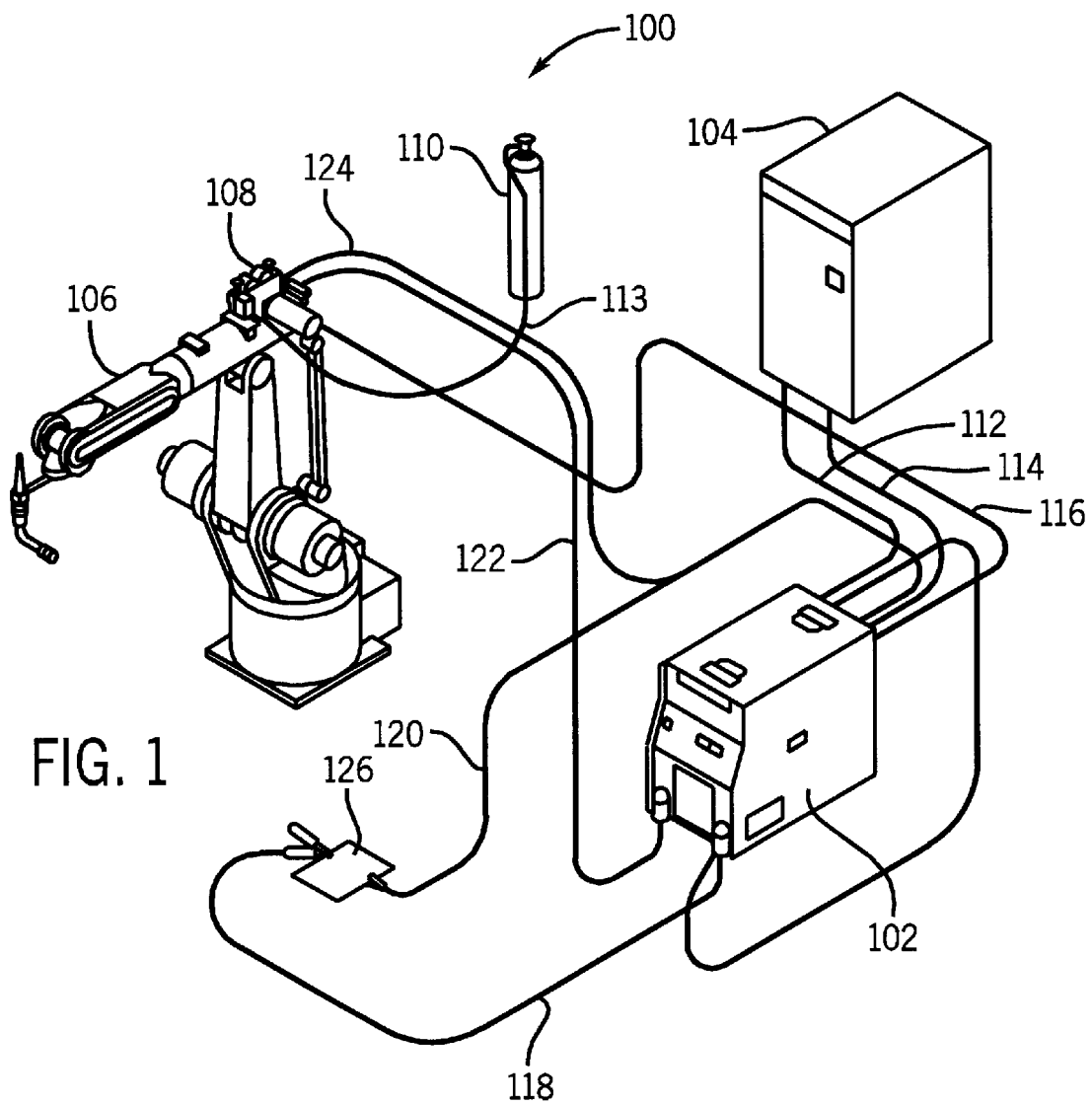
FIG. 1 is a diagram of a robotic welder in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular welding system using particular components in a particular environment it should be understood at the outset that the invention may also be implemented with other welding systems, power supplies, controllers, robots and components, and in other environments.

Generally, the invention relates to providing a welding system that may be used with a robot, that has an internal robot interface. Robot interface, or interfacing with a robot, as used herein, includes an interface that receives information from and sends information to a robot (including the robot controller). The welding controller detects the robot type and/or automatically sets up the system in various embodiments.

The interface is preferably such that it may be connected to the robot controller through an adaptor cord. Adaptor cords are preferably available for a number of robot types, and each has one end that is specific designed for a particular type of robot, and the other end is for the welding power supply and/or controller. The welding controller end of the adaptor cord has a first part of a mated connection that connects to a second part of the mated connection on the welding power supply house (which includes the power supply and controller).

Adaptor cord, as used herein, includes a cord having a mated connection on one end for a first type of connector, and a mated connection on the other end for a second type of connector. Specifically designed for the robot type, as used herein, includes a first part of a mated connector that mates with a second part on a specific type or model or welding robot. Mated connection, as used herein, includes a connection made that requires two corresponding connectors, such as female and male connectors. First and second parts of a mated connection, as used herein, include the structures that mate to form a connection.

The adaptor cord and power supply/controller mated connection have a plurality of connector thereon. The controller detects the robot type based on the connections made to the interface in one embodiment. Connectors on a mated connection, as used herein, includes pins, receptacles, protrusions, recesses, etc. on one part of the mated connector that mate with a corresponding structure on the other part of the mated connector.

Specifically, four pins are used to designate robot type (up to 16 types may be designated). Each type of adaptor cord has connections to a different combination of the four pins. The presence or absence of connections allows the controller to determine the robot type. Presence and absence of connections made, as used herein, includes whether or not pins, receptacles, etc. receive information, have a high or low logic signal applied thereto, or mate with a corresponding structure.

Having determined the robot type, the controller, in one embodiment, automatically sets up the parameters for welding with that robot. The controller has software or hardware (or both) that cooperate to be an automatic setup control or controller.

The welding power supply and controller used to implement the invention in the preferred embodiment is a phase controlled power supply, such as a Miller DeltaWeld™. Of course, other power supplies may be used, including inverter or converter based, engine driven, etc.

A robotic welder 100 includes a welding power supply/controller 102, having a power supply and a controller disposed therein (preferably a phase controlled power supply and the controller has a robot interface thereon), a robot controller 104, a robot 106, a wire feeder 108, and a source of gas 110, interconnected by a number of wires and connectors 112–124, which cooperate to produce a welding arc on the workpiece 126.

The connections between the components will now be described. Gas is provided through a hose 113 from gas source 110 to robot 106. Power is provided on cable 122 to robot 106 (and wire feeder 108) from power supply 102. Power is also provided from the negative output stud on power supply 102 on cable 118 to workpiece 126. The voltage sense leads 120 and 124 provide voltage feedback information to welding power supply/controller 102. Control signals are provided between robot controller 104 and welding controller 102 on lines 112 and 114. Control signals are also provided from power supply 102 to robot 106 on line 116. The arrangement thus far is generally similar to the prior art.

Figure 2:
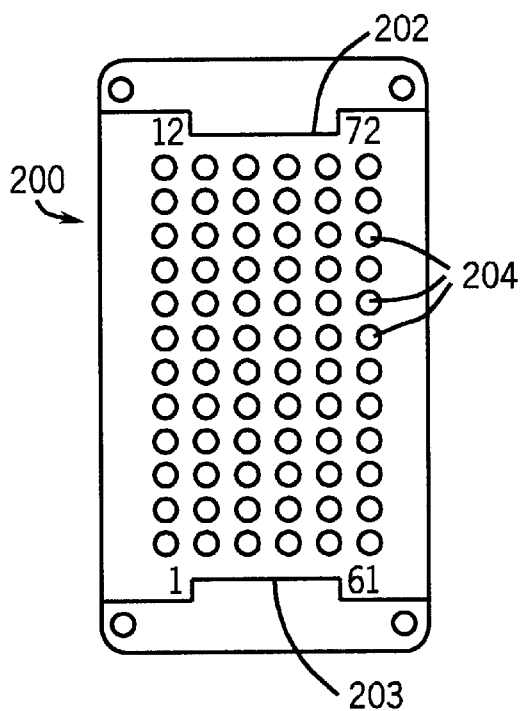
FIGS. 2 and 2A are end and side views of a robot interface connector in accordance with the present invention.
Figure 2A:
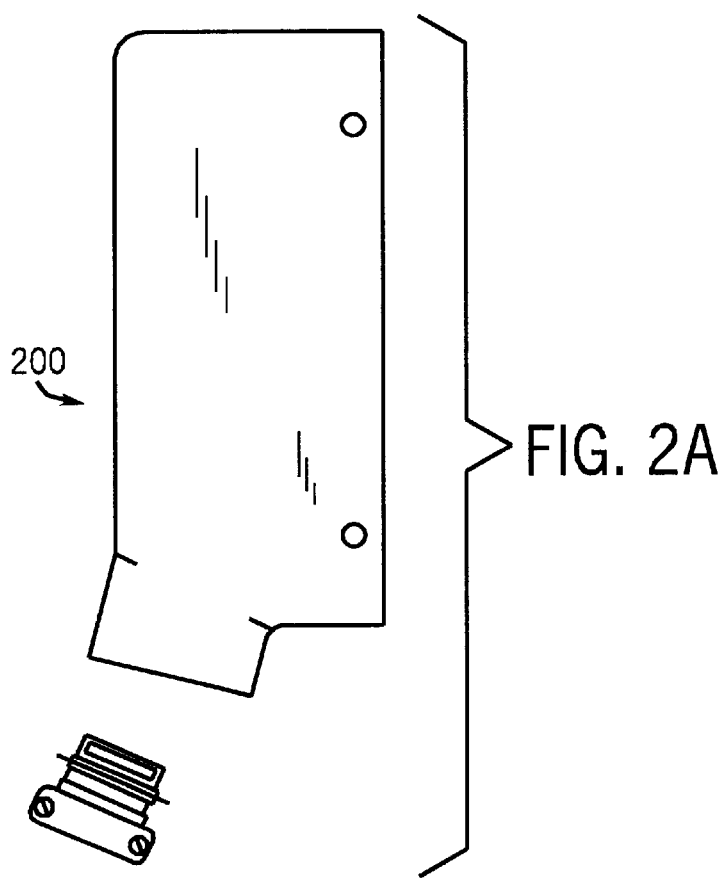

Controller 102 includes a robot interface that connects directly to robot controller 104. Referring now to FIG. 2, a mated connector 200 of an adaptor cord that mates with the robot interface may be seen from the end view and side view. Connector 200 includes a pair of notches 202 and 203 which mate with a receptacle (of the robot interface) on power supply/controller 102. A plurality of pins or connectors 204 are disposed on mated connector 200. Four of these pins or connectors are used to determine the robot type, and the remainder may be used to provide information between-robot controller 104 and power supply 102. Robot, as used herein, includes the mechanical portion 106 and the controller portion 104 of a robot.

Figure 3:
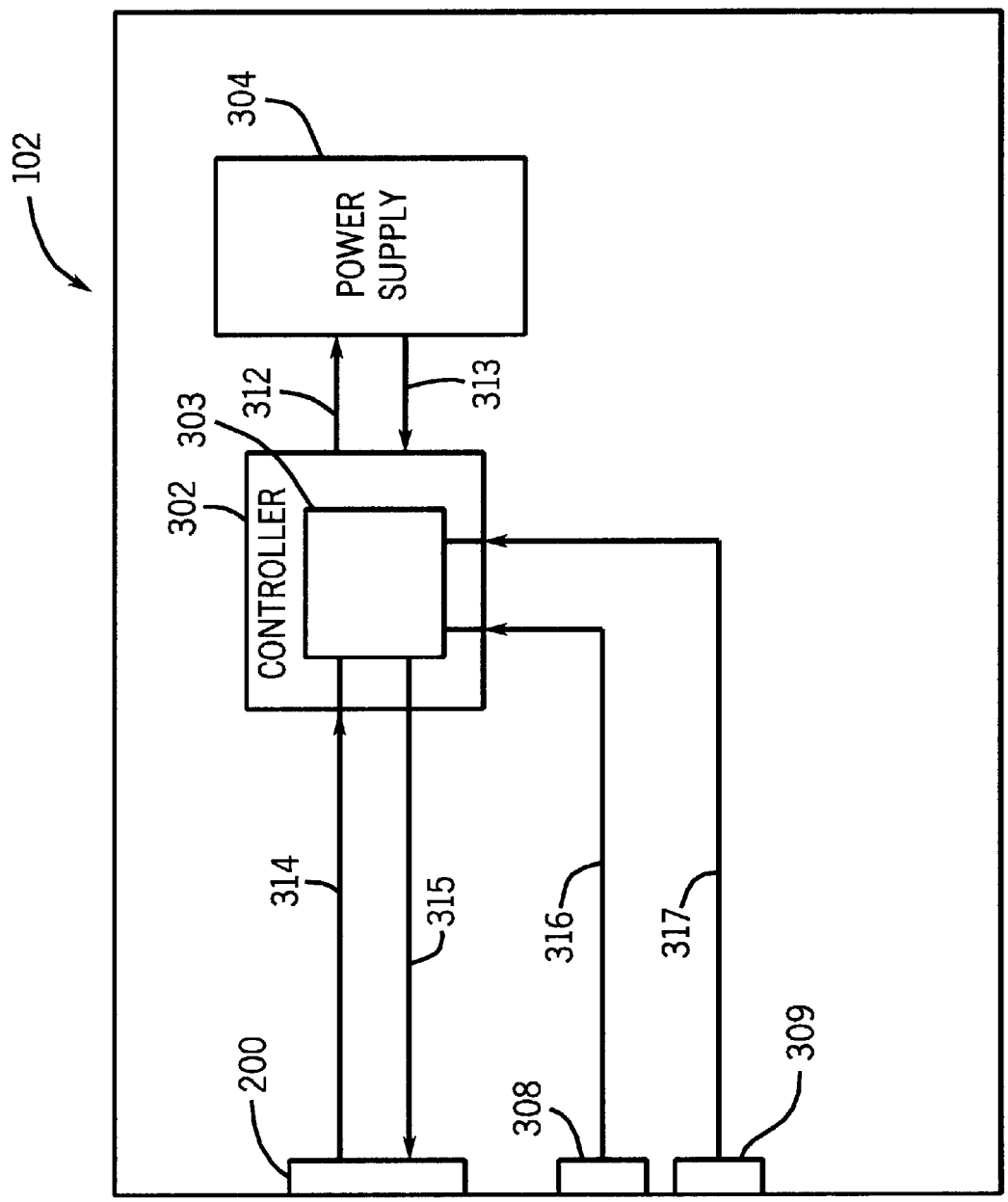
FIG. 3 is a schematic of a controller and power supply in accordance with the present invention.

Power supply/controller 102 includes, as stated above, a power supply and a controller. Referring now to FIG. 3 a diagram of one embodiment of power supply/controller 102 is shown to include a controller 302, including a microprocessor 303, a power circuit or power supply 304, a robot interface 200, a pair of feedback inputs 308 and 309, all interconnected by various lines or cables 312–317 (each of lines or cables 312–317 may include more than one connector power or signal carrying connector).

Power supply 302 is preferably a phase-controlled power supply such as a Miller DeltaWeld™ power supply. Phase controlled power supply, as used herein, includes a power circuit that has at least one phase controlled device, such as an SCR.

Controller 302 provides a controller output, or a power control output, to a control input of power supply 304 on control line 302. Controller, as used herein, includes digital and analog, circuitry, discrete or integrated circuitry, microprocessors, DSPs, etc., and software, hardware and firmware, located on one or more boards, used to control a device such as a power supply. Control input, as used herein, includes an input used to control a power supply, such as a setpoint, gate signals, phase control signals, etc. Control output, as used herein, includes an output used to control a power supply, such as a setpoint, gate signals, phase control signals, etc.

Feedback information is provided from power supply 304 to controller 302. Feedback information from outside power supply/controller 102 is provided on lines 316 and 317 from feedback inputs 308 and 309 to controller 302. Alternative embodiments provide for greater or fewer number of feedback inputs. Information is provided from the external robot and robot controller via robot interface 200 and line 314 to a set-up parameter input of controller 302. Set-up parameter input, as used herein, includes an input to a controller, on which the value of a set-up parameter is received.

Information is provided from controller 302 to robot interface 200, and then to robot controller 104 on line 315. Various embodiments provide for information to be provided only from controller 302 to robot controller 104, provided only from robot controller 104 to controller 302, or provided in both directions. A serial link or other communication protocol may be used to identify the system component types. Using this alternative the hardware jumpers and adaptors can be eliminated. The translation and identification of robot type can be done completely with software.

Controller 302 and microprocessor 303 have a robot-type detector (implemented with hardware and software in the preferred embodiment, and hardware only, or software only, in alternative embodiments) that detect which of the four pins on robot interface 200 have connections made thereto (or have high logic signals applied thereto), and from that information, determine the type of robot connected to robot interface 200. Robot-type detector, as used herein, includes a controller, or part of a controller, that determines they type, manufacturer, model of robot, or operating commands associated with the robot.

Controller 302 and microprocessor 302 also include an automatic set-up control (implemented with software and hardware) that, in response to the robot type and/or information provided by the robot controller sets up welding system 100.

Automatic set-up control, as used herein, includes a circuit or controller (or portion thereof) that automatically sets up a welding system. Automatically setting up a welding system, as used herein, includes a controller or circuitry setting operating parameters such as setpoints, output voltage, wire feed speed, voltage, current, etc., in response to detecting an operating condition or equipment type.

Preferably, welding system 100 is implemented in conjunction with a "smart" or "mid-range" robot that provides at least voltage set-point, wire feed speed set point, and start and stop welding information. (Alternatively, this data can be provided to controller 302 by other means.) Additional information may be used to set up the system, such as one or more other control or set up parameters (which includes parameters used to manually set up a prior art system like the Miller Auto Invision™: Mig Type, Aux Output, Voltage, Memory, Mig Type, Arc Start, Arc Time, Wire Feed, Wire type, Display, Memory, Shutdown, Name, Program, Stick check, Jog IPM, Robot type, Flow, Monitor, Software). The specific meaning of these parameters is readily known to one skilled in the art. Depending on the power supply chosen to implement the invention, some or many of the parameters will not be needed or provided. Set-up parameters, as used herein, includes parameters used to control the output of a welding power supply, such as voltage, current, wire feed speed, type of process, and the parameters listed above.

The preferred embodiment provides for the automatic configuration or setup of some variables within the power supply after detection of the robot type, without any form of serial communication to the robot. This is done through the use of an input jumper configuration inside the adapter cord that allows connection to different welding robots on the market. Each adapter has a unique combination of jumpers that specifies to what robot the power supply is connected. When the robot is connected, the controller automatically sets variables such as what to display, remote program select, stick check on or off, robot jog command, volt sense shutdown, auxiliary relay mode, and general arc sequencing. Specifically, for an ABB™ rotating the robot controls all weld sequencing, auxiliary relay is off, display commands, volt sense shutdown is off, remote program select is on, and robot jog command is off. For a FANUC™ robot, the robot controls all weld sequencing, auxiliary relay is off, display commands, volt sense shutdown is on, remote program select is on, and robot jog command is on.

In the preferred embodiment the information the robot has, which includes at least voltage set point, wire feed speed set point, and start and stop welding information, is provided from robot controller 104 to microprocessor 303 through robot interface 200. Controller 303 is able to interpret and use this information because the robot-type has been identified. Configuring the controller to be able to interpret the information, as well as using the information, is part of the automatic set-up in the preferred embodiment.

Figure 4:
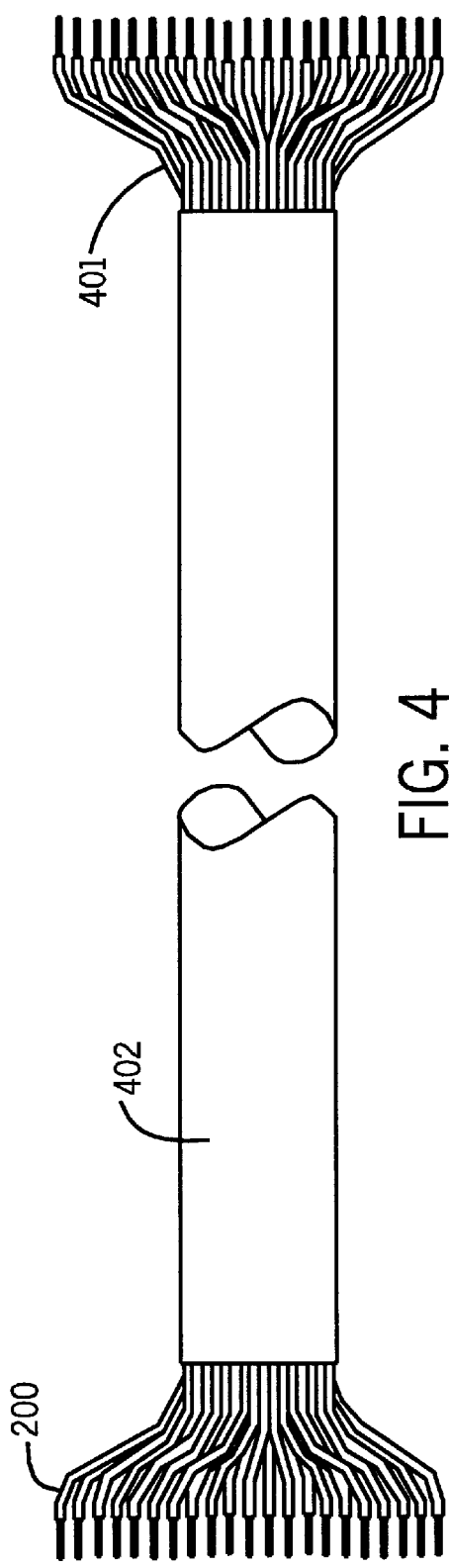
FIG. 4 is an adaptor cord in accordance with the present invention.
Figure 5:
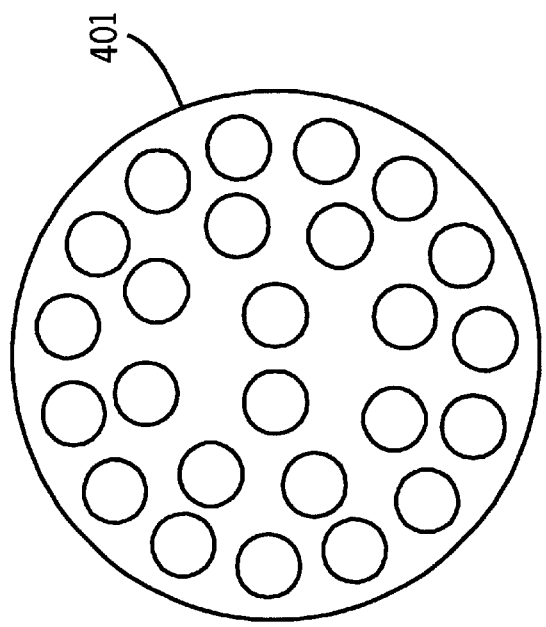
FIG. 5 is a robot connection of an adaptor cord in accordance with the present invention.

An adaptor cord used with the present invention is shown in FIG. 4 and includes robot interface mated connector 200, a robot connection 401, connected by a cord 402. Robot connection, as used herein, includes a first part of a mated connector, wherein the second part of the mated connector is on or connected to the robot. Robot connection 401, shown in detail in FIG. 5, is designed to mate with a specific type of robot (controller), and is capable of mating with a connector on the robot.

Because controller 302 includes the robot interface, all that is needed to connect controller/power supply 102 to robot controller 104 is adaptor cord 402. Also, because controller 302 runs software that detects the robot type the user does not need to specify the robot type. Additionally, because controller 302 runs software that sets up welding system 100, it is essentially a plug and play system. The information the user would need to enter from or about the robot, is automatically provided.

Numerous modifications may be made to the present invention which still fall within the intended scope hereof. Thus, it should be apparent that there has been provided in accordance with the present invention a method and apparatus for welding with a robotic system that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding system for use with a robotic welder comprising:
   a power supply having at least one control input;
   a robot interface; and
   a controller, in a single housing, including,
      a robot-type detector, connected to the robot interface, and
      at least one power control output connected to the at least one control input.

2. The system of claim 1, wherein the robot interface includes a first part of a mated connection, and the system further comprises:
   at least one adaptor cord having,
   a second part of the mated connection at a first end, and
   a robot connection at a second end.

3. The system of claim 2, wherein the at least one adaptor cord is a plurality of adaptor cords, each having a different robot connection.

4. The system of claim 1 wherein the robot-type detector is comprised of a software implemented by a digital circuit.

5. The system of claim 4, wherein the robot interface includes a first part of mated connection having a plurality of connectors, wherein the software uses the presence and absence of connections made to the plurality of connectors to determine the robot type.

6. The system of claim 4, wherein the controller further includes an automatic set-up control having:
   an input connected to the robot interface; and
   an output connected to the at least one power control output.

7. The system of claim 1, wherein the power supply is a phase controlled power supply.

8. The system of claim 1 further comprising a wire feeder connected to an output of the power supply.

9. A welding system for use with a robotic welder comprising:
   power means for providing welding power;
   interface means for interfacing with a robot;
   power control means for controlling the power means, the control means being connected to the power means; and
   detector means for detecting the robot type, the detector means being connected to the interface means and the control means;
   wherein the detector means and the power control means are in a single housing.

10. The system of claim 9 wherein the detector means and the power control means are part of a single controller.

11. The system of claim 9, further comprising cord means for connecting the interface means to a robot connection.

12. The system of claim 11, wherein the cord means includes a plurality of adaptor cords, each having a different robot connection.

13. The system of claim 9 wherein the detector means includes software implemented by a digital circuit.

14. The system of claim 13, wherein the interface means includes a plurality of connector means for connecting to a mated cord, and means for determining the robot type from the presence and absence of connections made to the plurality of connectors means.

15. The system of claim 13, wherein the interface means includes a plurality of connector means for connecting to a mated cord, and means for determining the robot type from signals on the plurality of connectors means.

16. The system of claim 13, wherein the power control means further includes a set-up means for automatically setting up the system in response to the detector means detecting the robot type.

17. The system of claim 9, wherein the power means includes means for providing phase controlled power.

18. A method of welding with a robotic welder comprising:
   providing welding power;
   interfacing with a robot;
   controlling the welding power; and
   detecting the robot type from interfacing.

19. The method of claim 18, wherein interfacing includes connecting a cord between a welding system and a robot.

20. The method of claim 19, wherein interfacing includes selecting one cord specifically designed for the robot type from a plurality of cords, each of the plurality being designed for a different robot type.

21. The method claim 18 wherein detecting includes running a software program.

22. The method of claim 21, wherein detecting includes determining the presence and absence of connections made to a plurality of connectors.

23. The method of claim 22, wherein interfacing includes determining the robot type from signals on a plurality of connectors.

24. The method of claim 21, wherein controlling includes automatically setting up a welding system in response to detecting.

25. The method of claim 18, wherein providing power includes providing phase controlled power.

26. A method of connecting a welding system to a robotic welder comprising:
   selecting an adaptor cord for the robot type;
   connecting a first end of the cord to the welding system;
   connecting a second end of the cord to the robot; and
   detecting the robot type from connection made.

27. An adaptor cord for connecting a welding system and a robotic welder comprising:

a first end having a first part of a mated connection,
  wherein the first part of the mated connection has a plurality of connectors, and
  wherein the arrangement of the connector indicate the robot type; and
a second end capable of mating with a connector on the robot.

28. An adaptor cord for connecting a welding system and a robotic welder comprising:
a first end having a first part of a mated connection,
  wherein the first part of the mated connection has a plurality of connectors, and
  wherein the signals provided on the plurality of connectors indicate the robot type; and
a second end capable of mating with a connector on the robot.

29. The cord of claim 28 wherein the arrangement of the connectors further indicates the robot type.

30. A welding system for use with a robotic welder comprising:
a power supply having at least one control input;
a controller, including
  at least one power control output connected to the at least one control input, and
  an automatic set-up control connected to the power control output;
a robot interface, wherein the automatic set-up control has a set-up parameter input connected to the robot interface; and
a robot-type detector, connected to the robot interface.

31. The system of claim 30, wherein the automatic set-up control has at least one parameter of the group consisting of: mig type, aux output, voltage, memory, mig type, arc start, arc time, wire feed, wire type, display, memory, shutdown, name, program, stick, jog ipm, robot, flow, monitor, software.

32. The system of claim 31 further comprising a wire feeder, wherein the automatic set-up control is connected to the wire feeder.

33. The system of claim 30 wherein the power supply is a phase controlled power supply.

34. The system of claim 30 wherein the robot-type detector is comprised of a software implemented by a digital circuit.

35. The system of claim 30 wherein the automatic setup control includes a microprocessor.

36. A welding system for use with a robotic welder comprising:
power supply means for providing welding power;
power control means for controlling the power supply means, connected to the power supply means;
set-up means for automatically setting-up the system, connected to the power control means;
means for interfacing with and receiving set-up parameters from a robot, connected to the set-up means; and
means for detecting a robot type, connected to the interface means.

37. The system of claim 36, wherein the set-up means has means for setting up at least one parameter of the group consisting of: mig type, aux output, voltage, memory, mig type, arc start, arc time, wire feed, wire type, display, memory, shutdown, name, program, stick, jog ipm, robot, flow, monitor, software.

38. The system of claim 37, further comprising a means for feeding wire, connected to the set-up means.

39. A method of welding with a robotic welder comprising:
providing welding power;
controlling the power provided;
automatically setting-up the system;
interfacing with a robot: and
receiving set-up parameters from the robot detecting a robot type.

40. The method of claim 39, wherein setting up the system includes setting up at least one parameter of the group consisting of: mig type, aux output, voltage, memory, mig type, arc start, arc time, wire feed, wire type, display, memory, shutdown, name, program, stick, jog ipm, robot, flow, monitor, software.

41. The method of claim 40 further comprising a feeding wire to an arc, and automatically setting up the wire feeder.

* * * * *